(12) United States Patent
Zhang et al.

(10) Patent No.: US 11,217,999 B2
(45) Date of Patent: Jan. 4, 2022

(54) PHOTOVOLTAIC POWER GENERATION INVERTER SYSTEM

(71) Applicant: HUAWEI TECHNOLOGIES CO., LTD., Guangdong (CN)

(72) Inventors: Yanzhong Zhang, Shanghai (CN); Xun Wang, Shanghai (CN); Roland Huempfner, Nuremberg (DE)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/113,453

(22) Filed: Dec. 7, 2020

(65) Prior Publication Data

US 2021/0091571 A1 Mar. 25, 2021

Related U.S. Application Data

(63) Continuation of application No. PCT/CN2019/106971, filed on Sep. 20, 2019.

(30) Foreign Application Priority Data

Sep. 21, 2018 (CN) .......................... 201811109472.5
Sep. 29, 2018 (CN) .......................... 201811150106.4

(51) Int. Cl.
*H02J 3/38* (2006.01)

(52) U.S. Cl.
CPC ........... *H02J 3/381* (2013.01); *H02J 2300/24* (2020.01)

(58) Field of Classification Search
CPC ........... H02J 3/381; H02J 3/38; H02J 2300/24
See application file for complete search history.

(56) References Cited

U.S. PATENT DOCUMENTS

| 8,642,879 | B2 | 2/2014 | Gilmore et al. |
| 2013/0200715 | A1 | 8/2013 | Pettersson et al. |
| 2018/0198284 | A1 | 7/2018 | Yasui |

FOREIGN PATENT DOCUMENTS

| CN | 101779291 A | 7/2010 |
| CN | 102624022 A | 8/2012 |
| CN | 103368200 A | 10/2013 |
| CN | 104113280 A | 10/2014 |
| CN | 104124703 A | 10/2014 |
| CN | 104167918 A | 11/2014 |
| CN | 105703389 A | 6/2016 |
| CN | 105743432 A | 7/2016 |
| CN | 206517369 U | 9/2017 |
| CN | 206892800 U | 1/2018 |
| CN | 109167390 A | 1/2019 |

*Primary Examiner* — Robert L Deberadinis
(74) *Attorney, Agent, or Firm* — Womble Bond Dickinson (US) LLP (57) ABSTRACT

Voltage in the photovoltaic power generation system can be increased under a same power conversion condition, to reduce a current in the photovoltaic power generation system, thereby reducing energy consumption and reducing costs of the photovoltaic power generation system. The system includes: a photovoltaic array, a direct current conversion unit, a bus unit, and an inverter unit, where there are one or more photovoltaic arrays; the photovoltaic array is configured to: convert solar energy into electric energy, in other words, generate direct current power, and output a direct current voltage. The bus unit stores direct current electric energy output by the direct current conversion unit or directly stores the direct current electric energy output by the photovoltaic array, to increase a bus voltage in the first bus unit.

13 Claims, 5 Drawing Sheets

PHOTOVOLTAIC POWER GENERATION INVERTER SYSTEM

CROSS-REFERENCE TO RELATED APPLICATIONS

This application is a continuation of International Application No. PCT/CN2019/106971, filed on Sep. 20, 2019, which claims priority to Chinese Patent Application No. 201811150106.4, filed on Sep. 29, 2018, which claims priority to Chinese Patent Application No. 201811109472.5, filed on Sep. 21, 2018, all of which are hereby incorporated by reference in their entireties.

TECHNICAL FIELD

This application relates to the field of photovoltaic power generation technologies, and in particular, to a photovoltaic power generation inverter system.

BACKGROUND

In recent years, renewable energy has attracted extensive attention. In the renewable energy, solar power generation causes less environmental pollution than conventional fossil power generation. In a photovoltaic power generation system, performance, reliability, management technologies, and the like of photovoltaic power generation become increasingly mature.

Currently, there are mainly the following three types of inverter architectures in the photovoltaic power generation system: a centralized architecture, a distributed architecture, and a decentralized architecture. An energy loss in the photovoltaic power generation system increases with a current in the photovoltaic power generation system with the centralized, distributed, and decentralized architectures.

SUMMARY

Embodiments of this application provide a photovoltaic power generation system, so that a voltage in the photovoltaic power generation system can be increased under a same power conversion condition, to reduce a current in the photovoltaic power generation system, thereby reducing energy consumption and reducing costs of the photovoltaic power generation system.

To achieve the foregoing objective, the embodiments of this application provide the following technical solutions:

According to a first aspect, an embodiment of this application provides a photovoltaic power generation inverter system, including: a photovoltaic array, a first direct current conversion unit, a first bus unit, and a first inverter unit, where there are one or more photovoltaic arrays, each photovoltaic array includes one or more cell panels, and there are one or more first direct current conversion units; an input end of one first direct current conversion unit is connected to an output end of one or more photovoltaic arrays, the first bus unit is connected to an output end of one or more first direct current conversion units, the first bus unit is connected to the first inverter unit, and a direct current voltage in the first bus unit is greater than a maximum system voltage applied to the cell panel; the first direct current conversion unit is configured to perform direct current power conversion on a direct current voltage output by the photovoltaic array; and the first inverter unit is configured to convert the direct current voltage in the first bus unit into an alternating current voltage.

In an embodiment, a positive electrode output end, a midpoint potential, and a negative electrode output end of the first direct current conversion unit are respectively connected to a positive electrode, a midpoint potential, and a negative electrode of the first bus unit through coupling, or a positive electrode output end and a negative electrode output end of the first direct current conversion unit are respectively connected to a positive electrode and a negative electrode of the first bus unit through coupling.

In an embodiment, the first bus unit is connected to the first inverter unit through coupling by using a positive electrode, a midpoint potential, and a negative electrode, or the first bus unit is connected to the first inverter unit through coupling by using a positive electrode and a negative electrode.

According to a second aspect, an embodiment of this application provides a photovoltaic power generation inverter system, including: a photovoltaic array, a second direct current conversion unit, a second bus unit, a second inverter unit, and a first transformer, where there are one or more photovoltaic arrays, and there are one or more second direct current conversion units; an input end of one second direct current conversion unit is connected to an output end of one or more photovoltaic arrays, the second bus unit is connected to an output end of one or more second direct current conversion units, an input end of the second inverter unit is connected to the second bus unit, an output end of the second inverter unit is connected to a secondary side of the first transformer, a line voltage of the secondary side of the first transformer is an alternating current voltage greater than 1000 V, and a primary side of the first transformer is connected to a power grid; the second direct current conversion unit is configured to perform direct current power conversion on a direct current voltage output by the photovoltaic array; the second inverter unit is configured to convert a direct current voltage in the second bus unit into an alternating current voltage; and the first transformer is configured to transmit, to the power grid, the alternating current voltage output by the second inverter unit.

In an embodiment, a positive electrode output end, a midpoint potential, and a negative electrode output end of the second direct current conversion unit are respectively connected to a positive electrode, a midpoint potential, and a negative electrode of the second bus unit through coupling, or a positive electrode output end and a negative electrode output end of the second direct current conversion unit are respectively connected to a positive electrode and a negative electrode of the second bus unit through coupling.

In an embodiment, the second bus unit is connected to the second inverter unit through coupling by using a positive electrode, a midpoint potential, and a negative electrode, or the second bus unit is connected to the second inverter unit through coupling by using a positive electrode and a negative electrode.

According to a third aspect, an embodiment of this application provides a photovoltaic power generation inverter system, including: a photovoltaic array, a third bus unit, a third inverter unit, and a second transformer, where there are one or more photovoltaic arrays; the third bus unit is connected to one or more photovoltaic arrays, the third bus unit is connected to an input end of the third inverter unit, an output end of the third inverter unit is connected to a secondary side of the second transformer, a line voltage of the secondary side of the second transformer is an alternating current voltage greater than 1000 V, and a primary side of the second transformer is connected to a power grid; the photovoltaic array is configured to generate direct current power; the third inverter unit is configured to convert a direct current voltage in the third bus unit into an alternating current voltage; and the second transformer is configured to transmit, to the power grid, the alternating current voltage output by the third inverter unit.

In an embodiment, a positive electrode output end and a negative electrode output end of the photovoltaic array are respectively connected to a positive electrode and a negative electrode of the second bus unit through coupling.

In an embodiment, the third bus unit is connected to the third inverter unit through coupling by using a positive electrode, a midpoint potential, and a negative electrode, or the third bus unit is connected to the third inverter unit through coupling by using a positive electrode and a negative electrode.

According to a fourth aspect, an embodiment of this application provides a photovoltaic power generation inverter system, including: a photovoltaic array, a third direct current conversion unit, a fourth bus unit, and a seventh inverter unit, where there are one or more photovoltaic arrays, and there are one or more third direct current conversion units; an input end of one third direct current conversion unit is connected to an output end of one or more photovoltaic arrays, the fourth bus unit is connected to an output end of one or more direct current conversion units, the seventh inverter unit is connected to the fourth bus unit, and a direct current voltage in the fourth bus unit is greater than 1000 V; the third direct current conversion unit is configured to perform direct current power conversion on a direct current voltage output by the photovoltaic array; and the seventh inverter unit is configured to convert the direct current voltage in the fourth bus unit into an alternating current voltage.

In an embodiment, a positive electrode output end, a midpoint potential, and a negative electrode output end of the third direct current conversion unit are respectively connected to a positive electrode, a midpoint potential, and a negative electrode of the fourth bus unit through coupling, or a positive electrode output end and a negative electrode output end of the third direct current conversion unit are respectively connected to a positive electrode and a negative electrode of the fourth bus unit through coupling.

In an embodiment, the fourth bus unit is connected to the seventh inverter unit through coupling by using a positive electrode, a midpoint potential, and a negative electrode, or the fourth bus unit is connected to the seventh inverter unit through coupling by using a positive electrode and a negative electrode.

According to a fifth aspect, an embodiment of this application provides a photovoltaic power generation inverter system, including: a photovoltaic array, a fourth direct current conversion unit, a fifth bus unit, and a fifth inverter unit, where there are one or more photovoltaic arrays, and there are one or more fourth direct current conversion units; an input end of one fourth direct current conversion unit is connected to an output end of one or more photovoltaic arrays, the fifth bus unit is connected to an output end of one or more direct current conversion units, the fifth inverter unit is connected to the fifth bus unit, and a direct current voltage in the fifth bus unit is greater than 1500 V; the fourth direct current conversion unit is configured to perform direct current power conversion on a direct current voltage output by the photovoltaic array; and the fifth inverter unit is configured to convert the direct current voltage in the fifth bus unit into an alternating current voltage.

In an embodiment, a positive electrode output end, a midpoint potential, and a negative electrode output end of the fourth direct current conversion unit are respectively connected to a positive electrode, a midpoint potential, and a negative electrode of the fifth bus unit through coupling, or a positive electrode output end and a negative electrode output end of the fourth direct current conversion unit are respectively connected to a positive electrode and a negative electrode of the fifth bus unit through coupling.

In an embodiment, the fifth bus unit is connected to the fifth inverter unit through coupling by using a positive electrode, a midpoint potential, and a negative electrode, or the fifth bus unit is connected to the fifth inverter unit through coupling by using a positive electrode and a negative electrode.

It can be learned from the foregoing technical solutions that the photovoltaic array is configured to: convert solar energy into electric energy, in other words, generate direct current power, and output a direct current voltage; the bus unit is configured to store direct current electric energy output by the direct current conversion unit or directly store the direct current electric energy output by the photovoltaic array, to increase a bus voltage between the positive electrode and the negative electrode of the first bus unit, where the bus voltage is a direct current voltage; and the inverter unit converts the bus voltage in the bus unit into an alternating current voltage, to transmit energy to the power grid. It can be learned from the foregoing technical solutions that an increase in the bus voltage in the bus unit means an increase in an input voltage of the inverter unit, so that the input voltage of the inverter unit is increased under a same power conversion condition, which can effectively reduce a direct current bus current in the photovoltaic power generation inverter system and correspondingly reduce an alternating current obtained after inversion by the inversion unit. Therefore, an electric energy loss in the photovoltaic power generation inverter system is reduced.

Further, because of a reduction in the direct current bus current, costs and a loss of a direct current cable can be reduced by using a low-voltage small-diameter cable, and because of a reduction in the alternating current output by an inverter, costs and a loss of an alternating current cable are reduced, thereby reducing costs of the photovoltaic power generation inverter system.

BRIEF DESCRIPTION OF DRAWINGS

To describe the technical solutions in the embodiments of this application more clearly, the following briefly describes the accompanying drawings required for describing the embodiments. Apparently, the accompanying drawings in the following description show merely some embodiments of this application, and persons of ordinary skill in the art may further derive other drawings from these accompanying drawings without creative efforts.

DESCRIPTION OF EMBODIMENTS

The embodiments of this application provide a photovoltaic power generation inverter system, so that an input voltage and a grid connection voltage of an inverter are increased under a same power conversion condition, to reduce an energy loss in the photovoltaic power generation inverter system.

The term "and/or" in this application may describe an association relationship between associated objects, and represents that three relationships may exist. For example, A and/or B may represent the following three cases: Only A exists, both A and B exist, and only B exists. In addition, the character "/" in this application usually indicates an "or" relationship between associated objects.

In the specification, claims, and accompanying drawings of this application, the terms "first", "second", and the like are intended to distinguish between similar objects but do not necessarily describe a specific order or sequence. It should be understood that data used in such a manner is interchangeable in proper circumstances, so that the embodiments described herein can be implemented in other orders than the order illustrated or described herein. In addition, the terms "include", "comprise", and any other variants are intended to cover the non-exclusive inclusion, for example, a process, method, system, product, or device that includes a list of operations or modules is not necessarily limited to those expressly listed operations or modules, but may include other operations or modules not expressly listed or inherent to such a process, method, product, or device. Names or numbers of operations in this application do not mean that the operations in a method procedure need to be performed in a time/logical order indicated by the names or numbers. An execution order of the named or numbered procedure operations may be changed based on a to-be-achieved technical objective provided that same or similar technical effects can be achieved. The module division in this application is logical division, and may be other division in other embodiments. For example, a plurality of modules may be combined or integrated into another system, or some features may be ignored or not performed. In addition, the displayed or discussed mutual couplings or direct couplings or communication connections may be implemented through some interfaces. The indirect couplings or communication connections between the modules may be implemented in electrical or another form. This is not limited in this application. In addition, the modules or submodules described as separate components may or may not be physically separate, may or may not be physical modules, or may be grouped into a plurality of circuit modules. Some or all of the modules may be selected based on actual requirements to achieve the objectives of the solutions of this application.

The embodiments of this application are applicable to photovoltaic power generation in which solar energy is converted into electric energy by using a photovoltaic panel, and the electric energy is integrated into a power grid. The electric energy obtained through conversion by the photovoltaic panel is a direct current, and needs to be transmitted in the power grid in an alternating current form. Therefore, after the photovoltaic panel converts the solar energy into the direct current, the direct current needs to be inverted into a three-phase alternating current to be integrated into the power grid by using a step-up transformer. The photovoltaic power generation inverter system provided in the embodiments of this application is configured to convert a direct current output by the photovoltaic panel into an alternating current, to transmit energy to the power grid.

According to the photovoltaic power generation inverter system provided in the embodiments of this application, an input voltage of an inverter unit can be increased under a same power conversion condition, which can effectively reduce a direct current bus current in the photovoltaic power generation inverter system and correspondingly reduce an alternating current obtained after inversion by the inverter unit. Therefore, an electric energy loss in the photovoltaic power generation inverter system is reduced.

To facilitate understanding of the technical solutions in the embodiments of this application, the following describes in detail, with reference to specific embodiments in the following aspects, the photovoltaic power generation inverter system provided in the embodiments of this application.

Figure 1:
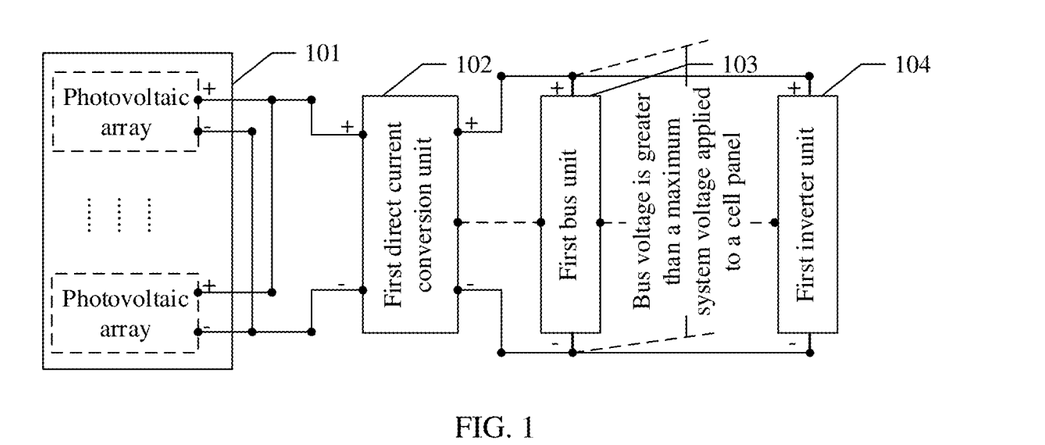
FIG. 1 is a schematic diagram of an embodiment of a photovoltaic power generation inverter system according to an embodiment of this application.

FIG. 1 is a schematic diagram of an embodiment of a photovoltaic power generation inverter system according to an embodiment of this application.

According to a first aspect, as shown in FIG. 1, the photovoltaic power generation inverter system includes a photovoltaic array 101, a first direct current conversion unit 102, a first bus unit 103, and a first inverter unit 104. There are one or more photovoltaic arrays 101, and each photovoltaic array includes one or more cell panels.

A positive electrode input end of the first direct current conversion unit 102 is connected to a positive electrode output end of the photovoltaic array 101, a negative electrode end of the first direct current conversion unit 102 is connected to a negative electrode output end of the photovoltaic array 101, a positive electrode output end of the first direct current conversion unit 102 is connected to a positive electrode of the first bus unit 103, a negative electrode output end of the first direct current conversion unit 102 is connected to a negative electrode of the first bus unit 103, a bus voltage between the positive electrode and the negative electrode of the first bus unit 103 is greater than a maximum system voltage applied to the cell panel in the photovoltaic array, and the first bus unit 103 is connected to the first inverter unit 104.

When the photovoltaic power generation inverter system works normally, the photovoltaic array 101 generates direct current power, the first direct current conversion unit 102 performs direct current power conversion on the direct current power generated by the photovoltaic array 101, and then inputs the direct current power to the first bus unit 103 for storage, and the first inverter unit 104 converts a direct current stored between the positive electrode and the negative electrode of the first bus unit 103 into an alternating current, to transmit energy to a power grid.

It should be noted that there may be one or more direct current conversion units. When there are a plurality of direct current conversion units, one direct current conversion unit may be connected to one or more corresponding photovoltaic arrays. There may also be one or more bus units. When there are a plurality of bus units, one bus unit may be connected to one or more corresponding direct current conversion units.

In an embodiment, the positive electrode output end, a midpoint potential, and the negative electrode output end of the first direct current conversion unit 102 are respectively connected to the positive electrode, a midpoint potential, and the negative electrode of the first bus unit 103 through coupling. The midpoint potential of the first direct current conversion unit 102 is connected to the midpoint potential of the first bus unit 103 through coupling, as shown in a dotted line part between the first direct current conversion unit 102 and the first bus unit 103 in FIG. 1.

In an embodiment, the positive electrode output end and the negative electrode output end of the first direct current conversion unit 102 are respectively connected to the positive electrode and the negative electrode of the first bus unit 103 through coupling.

In an embodiment, the first bus unit 103 is connected to the first inverter unit 104 through coupling by using the positive electrode, a midpoint potential, and the negative electrode. The midpoint potential of the first bus unit 103 is connected to a midpoint potential of the first inverter unit 104 through coupling, as shown in a dotted line part between the first bus unit 103 and the first inverter unit 104 in FIG. 1.

In an embodiment, the first bus unit is connected to the first inverter unit through coupling by using the positive electrode and the negative electrode.

Figure 2:
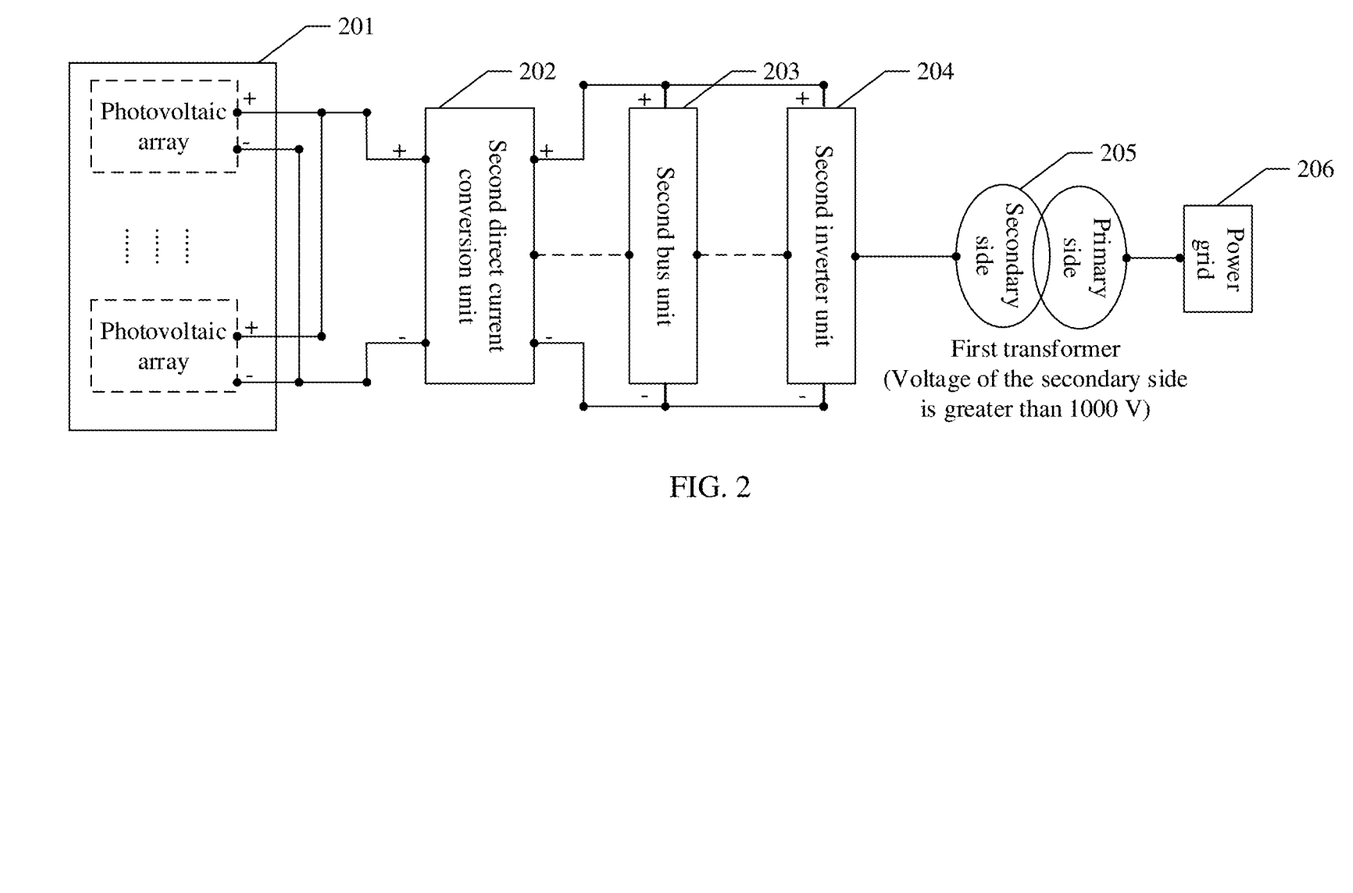
FIG. 2 is a schematic diagram of another embodiment of a photovoltaic power generation inverter system according to an embodiment of this application.

FIG. 2 is a schematic diagram of another embodiment of a photovoltaic power generation inverter system according to an embodiment of this application.

According to a second aspect, the photovoltaic power generation inverter system includes a photovoltaic array 201, a second direct current conversion unit 202, a second bus unit 203, a second inverter unit 204, and a first transformer 205. There are one or more photovoltaic arrays.

A positive electrode input end of the second direct current conversion unit 202 is connected to a positive electrode output end of the photovoltaic array 201, a negative electrode input end of the second direct current conversion unit is connected to a negative electrode output end of the photovoltaic array 201, a positive electrode output end of the second direct current conversion unit 202 is connected to a positive electrode of the second bus unit 203, a negative electrode output end of the second direct current conversion unit 202 is connected to a negative electrode of the second bus unit 203, the positive electrode and the negative electrode of the second bus unit 203 are connected to an input end of the second inverter unit 204, an output end of the second inverter unit 204 is connected to a secondary side of the first transformer 205, and a primary side of the first transformer 205 is connected to a power grid 206.

When the photovoltaic power generation inverter system works normally, the photovoltaic array 201 generates direct current power, the second direct current conversion unit 202 performs direct current power conversion on the direct current power generated by the photovoltaic array 201, and then inputs the direct current power to the second bus unit 203 for storage, the second inverter unit 204 converts a direct current stored between the positive electrode and the negative electrode of the second bus unit 203 into an alternating current, and the first transformer 205 outputs, to the power grid 206, an alternating current voltage output by the second inverter unit 204. When the photovoltaic power generation inverter system works normally, a line voltage of the secondary side of the first transformer 205 is an alternating current voltage greater than 1000 V.

Similarly, it should be noted that there may be one or more direct current conversion units. When there are a plurality of direct current conversion units, one direct current conversion unit may be connected to one or more corresponding photovoltaic arrays. There may also be one or more bus units. When there are a plurality of bus units, one bus unit may be connected to one or more corresponding direct current conversion units.

In an embodiment, the positive electrode output end, a midpoint potential, and the negative electrode output end of the second direct current conversion unit 202 are respectively connected to the positive electrode, a midpoint potential, and the negative electrode of the second bus unit 203 through coupling. The midpoint potential of the second direct current conversion unit 202 is connected to the midpoint potential of the second bus unit 203 through coupling, as shown in a dotted line part between the second direct current conversion unit 202 and the second bus unit 203 in FIG. 2.

In an embodiment, the positive electrode output end and the negative electrode output end of the second direct current conversion unit 202 are respectively connected to the positive electrode and the negative electrode of the second bus unit 203 through coupling.

In an embodiment, the second bus unit 203 is connected to the second inverter unit 204 through coupling by using the positive electrode, a midpoint potential, and the negative electrode. The midpoint potential of the second bus unit 203 is connected to a midpoint potential of the second inverter unit 204 through coupling, as shown in a dotted line part between the second bus unit 203 and the second inverter unit 204 in FIG. 2.

In an embodiment, the second bus unit 203 is connected to the second inverter unit 204 through coupling by using the positive electrode and the negative electrode.

Figure 3:
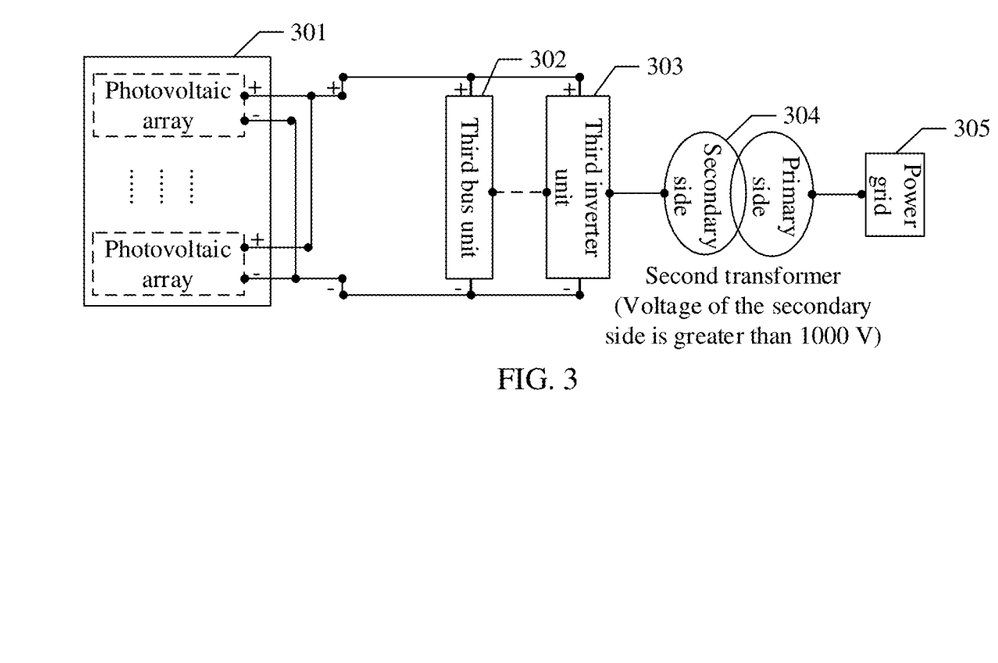
FIG. 3 is a schematic diagram of another embodiment of a photovoltaic power generation inverter system according to an embodiment of this application.

FIG. 3 is a schematic diagram of another embodiment of a photovoltaic power generation inverter system according to an embodiment of this application.

According to a third aspect, as shown in FIG. 3, the photovoltaic power generation inverter system includes a photovoltaic array 301, a third bus unit 302, a third inverter unit 303, and a second transformer 304. There are one or more photovoltaic arrays.

A positive electrode and a negative electrode of the photovoltaic array 301 are respectively connected to a positive electrode and a negative electrode of the third bus unit 302, the third bus unit 302 is connected to an input end of the third inverter unit 303, an output end of the third inverter unit 303 is connected to a secondary side of the second transformer 304, and a primary side of the second transformer 304 is connected to a power grid 305.

When the photovoltaic power generation inverter system works normally, the photovoltaic array 301 generates direct current power, the third bus unit 302 stores the direct current power generated by the photovoltaic array 301, the third inverter unit 303 converts a direct current stored between the positive electrode and the negative electrode of the third bus unit 302 into an alternating current, and the second transformer 304 outputs, to the power grid 305, an alternating current voltage output by the third inverter unit 303. When the photovoltaic power generation inverter system works normally, a line voltage of the secondary side of the second transformer 304 is an alternating current voltage greater than 1000 V.

Similarly, it should be noted that there may be one or more direct current conversion units. When there are a plurality of direct current conversion units, one direct current conversion unit may be connected to one or more corresponding photovoltaic arrays. There may also be one or more bus units. When there are a plurality of bus units, one bus unit may be connected to one or more corresponding direct current conversion units.

In an embodiment, a positive electrode output end and a negative electrode output end of the photovoltaic array 301 are respectively connected to the positive electrode and the negative electrode of the third bus unit 302 through coupling.

In an embodiment, the third bus unit 302 is connected to the third inverter unit 303 through coupling by using the positive electrode, a midpoint potential, and the negative electrode. The midpoint potential of the third bus unit 302 is connected to a midpoint potential of the third inverter unit 303 through coupling, as shown in a dotted line part between the third bus unit 302 and the third inverter unit 303 in FIG. 3.

In an embodiment, the third bus unit 302 is connected to the third inverter unit 303 through coupling by using the positive electrode and the negative electrode.

Figure 4:
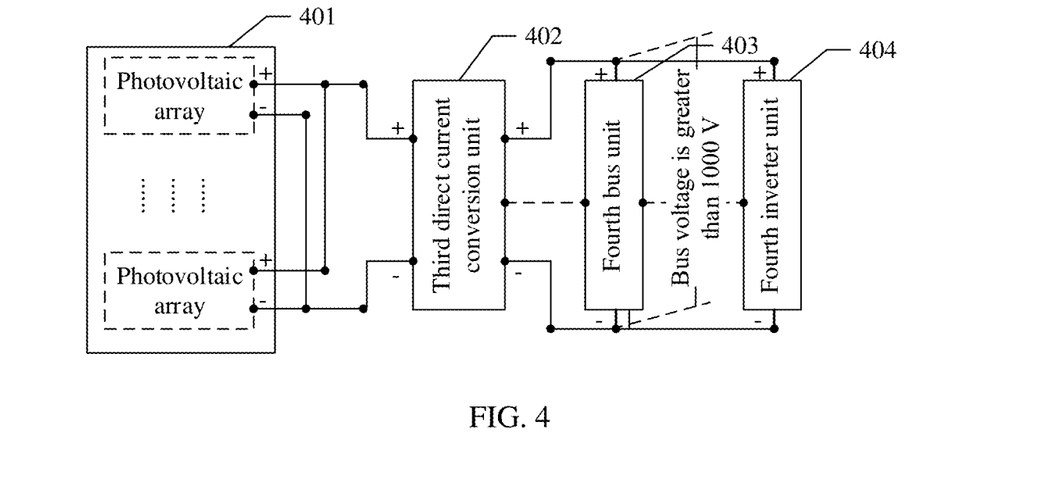
FIG. 4 is a schematic diagram of another embodiment of a photovoltaic power generation inverter system according to an embodiment of this application.

FIG. 4 is a schematic diagram of another embodiment of a photovoltaic power generation inverter system according to an embodiment of this application.

According to a fourth aspect, as shown in FIG. 4, the photovoltaic power generation inverter system includes a photovoltaic array 401, a third direct current conversion unit 402, a fourth bus unit 403, and a fourth inverter unit 404. There are one or more photovoltaic arrays.

A positive electrode input end of the third direct current conversion unit 402 is connected to a positive electrode output end of the photovoltaic array 401, a negative electrode end of the third direct current conversion unit 402 is connected to a negative electrode output end of the photovoltaic array 401, a positive electrode output end of the third direct current conversion unit 402 is connected to a positive electrode of the fourth bus unit 403, a negative electrode output end of the third direct current conversion unit 402 is connected to a negative electrode of the fourth bus unit 403, a bus voltage between the positive electrode and the negative electrode of the fourth bus unit 403 is greater than 1000 V, and the fourth bus unit 403 is connected to the fourth inverter unit 404.

When the photovoltaic power generation inverter system works normally, the photovoltaic array 401 generates direct current power, the third direct current conversion unit 402 performs direct current power conversion on the direct current power generated by the photovoltaic array 401, and then inputs the direct current power to the fourth bus unit 403 for storage, and the fourth inverter unit 404 converts a direct current stored between the positive electrode and the negative electrode of the fourth bus unit 403 into an alternating current, to transmit energy to a power grid.

Similarly, it should be noted that there may be one or more direct current conversion units. When there are a plurality of direct current conversion units, one direct current conversion unit may be connected to one or more corresponding photovoltaic arrays. There may also be one or more bus units. When there are a plurality of bus units, one bus unit may be connected to one or more corresponding direct current conversion units.

In an embodiment, the positive electrode output end, a midpoint potential, and the negative electrode output end of the third direct current conversion unit 402 are respectively connected to the positive electrode, a midpoint potential, and the negative electrode of the fourth bus unit 403 through coupling. The midpoint potential of the third direct current conversion unit 402 is connected to the midpoint potential of the fourth bus unit 403 through coupling, as shown in a dotted line part between the third direct current conversion unit 402 and the fourth bus unit 403 in FIG. 4.

In an embodiment, the positive electrode output end and the negative electrode output end of the third direct current conversion unit 402 are respectively connected to the positive electrode and the negative electrode of the fourth bus unit 403 through coupling.

In an embodiment, the fourth bus unit 403 is connected to the fourth inverter unit 404 through coupling by using the positive electrode, a midpoint potential, and the negative electrode. The midpoint potential of the fourth bus unit 403 is connected to a midpoint potential of the fourth inverter unit 404 through coupling, as shown in a dotted line part between the fourth bus unit 403 and the fourth inverter unit 404 in FIG. 4.

In an embodiment, the fourth bus unit 403 is connected to the fourth inverter unit 404 through coupling by using the positive electrode and the negative electrode.

Figure 5:
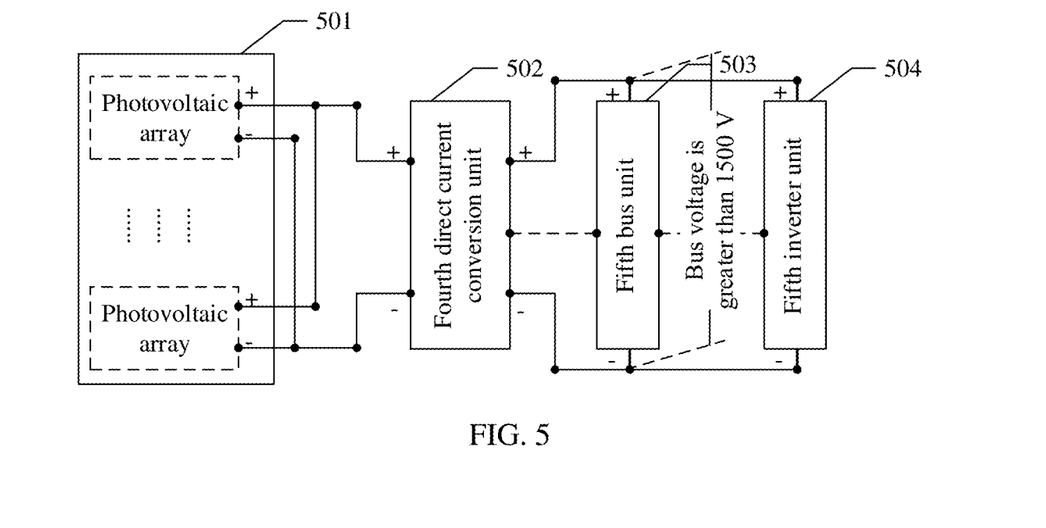
FIG. 5 is a schematic diagram of another embodiment of a photovoltaic power generation inverter system according to an embodiment of this application.

FIG. 5 is a schematic diagram of another embodiment of a photovoltaic power generation inverter system according to an embodiment of this application.

According to a fifth aspect, as shown in FIG. 5, the photovoltaic power generation inverter system includes a photovoltaic array 501, a fourth direct current conversion unit 502, a fifth bus unit 503, and a fifth inverter unit 504. There are one or more photovoltaic arrays.

A positive electrode input end of the fourth direct current conversion unit 502 is connected to a positive electrode output end of the photovoltaic array 501, a negative electrode end of the fourth direct current conversion unit 502 is connected to a negative electrode output end of the photovoltaic array 501, a positive electrode output end of the fourth direct current conversion unit 502 is connected to a positive electrode of the fifth bus unit 503, a negative electrode output end of the fourth direct current conversion unit 502 is connected to a negative electrode of the fifth bus unit 503, a bus voltage between the positive electrode and the negative electrode of the fifth bus unit 503 is greater than 1500 V, and the fifth bus unit 503 is connected to the fifth inverter unit 504.

When the photovoltaic power generation inverter system works normally, the photovoltaic array 501 generates direct current power, the fourth direct current conversion unit 502 performs direct current power conversion on the direct current power generated by the photovoltaic array 501, and then inputs the direct current power to the fifth bus unit 503 for storage, and the fifth inverter unit 504 converts a direct current stored between the positive electrode and the negative electrode of the fifth bus unit 503 into an alternating current, to transmit energy to a power grid.

Similarly, it should be noted that there may be one or more direct current conversion units. When there are a plurality of direct current conversion units, one direct current conversion unit may be connected to one or more corresponding photovoltaic arrays. There may also be one or more bus units. When there are a plurality of bus units, one bus unit may be connected to one or more corresponding direct current conversion units.

In an embodiment, the positive electrode output end, a midpoint potential, and the negative electrode output end of the fourth direct current conversion unit 502 are respectively connected to the positive electrode, a midpoint potential, and the negative electrode of the fifth bus unit 503 through coupling. The midpoint potential of the fourth direct current conversion unit 502 is connected to the midpoint potential of the fifth bus unit 503 through coupling, as shown in a dotted line part in FIG. 5.

In an embodiment, the positive electrode output end and the negative electrode output end of the fourth direct current conversion unit 502 are respectively connected to the positive electrode and the negative electrode of the fifth bus unit 503 through coupling.

In an embodiment, the fifth bus unit 503 is connected to the fifth inverter unit 504 through coupling by using the positive electrode, a midpoint potential, and the negative electrode. The midpoint potential of the fifth bus unit 503 is connected to the fifth inverter unit 504, as shown in a dotted line part in FIG. 5.

In an embodiment, the fifth bus unit 503 is connected to the fifth inverter unit 504 through coupling by using the positive electrode and the negative electrode.

Figure 6:
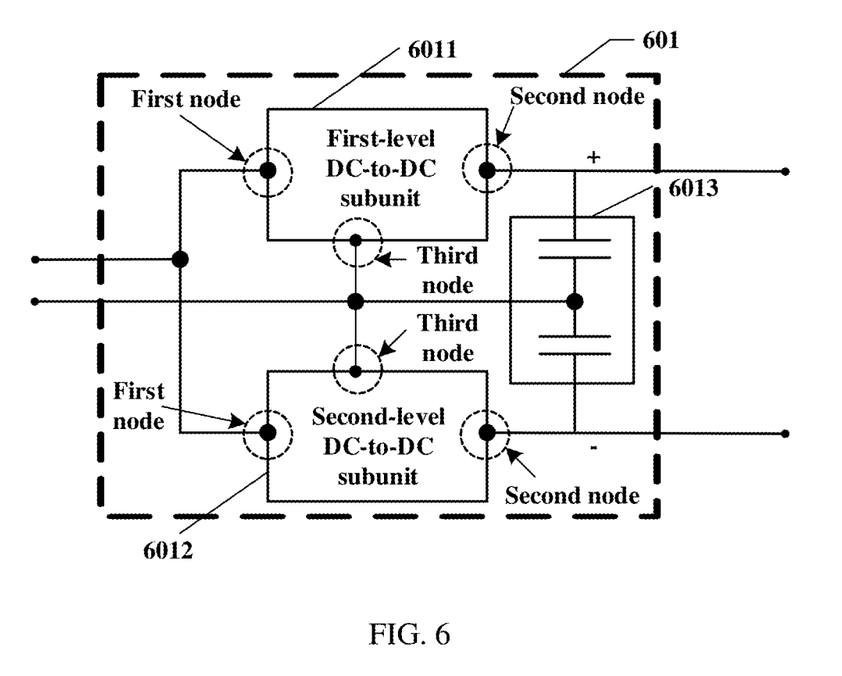
FIG. 6 is a schematic diagram of an embodiment of a direct current conversion unit according to an embodiment of this application.

FIG. 6 is a schematic diagram of an embodiment of a direct current conversion unit according to an embodiment of this application.

The direct current conversion unit in any one of FIG. 1, FIG. 2, FIG. 4, or FIG. 5 may be but is not limited to the direct current conversion unit shown in FIG. 6.

As shown in FIG. 6, the direct current conversion unit 601 includes a first-level DC-to-DC subunit 6011, a second-level DC-to-DC subunit 6012, and a direct current output bus 6013. A structure of the direct current output bus 6013 is similar to that of a bus unit. The direct current output bus 6013 also includes a midpoint potential including two capacitors: an upper capacitor and a lower capacitor. A positive electrode of the upper capacitor is a positive electrode of the direct current output bus 6013, a negative electrode of the upper capacitor is connected to a positive electrode of the lower capacitor, and a negative electrode of the lower capacitor is a negative electrode of the direct current output bus 6013.

The first-level DC-to-DC subunit 6011 and the second-level DC-to-DC subunit 6012 each include three nodes. The six nodes shown in FIG. 6 are connected as follows: A first node of the first-level DC-to-DC subunit 6011 and a first node of the second-level DC-to-DC subunit are connected to a positive electrode output end of a photovoltaic array, a second node of the first-level DC-to-DC subunit 6011 is connected to the positive electrode of the direct current output bus 6013, a second node of the second-level DC-to-DC subunit 6012 is connected to the negative electrode of the direct current output bus 6013, a third node of the first-level DC-to-DC subunit 6011 is connected to a negative electrode output end of the photovoltaic array and the midpoint potential of the direct current output bus 6013, and a third node of the second-level DC-to-DC subunit 6012 is connected to the negative electrode output end of the photovoltaic array and the midpoint potential of the direct current output bus 6013.

In addition, different from the connection manner in FIG. 6, the six nodes may be alternatively connected as follows: A first node of the first-level DC-to-DC subunit 6011 and a first node of the second-level DC-to-DC subunit are connected to a negative electrode output end of a photovoltaic array, a second node of the first-level DC-to-DC subunit 6011 is connected to the positive electrode of the direct current output bus 6013, a second node of the second-level DC-to-DC subunit 6012 is connected to the negative electrode of the direct current output bus 6013, a third node of the first-level DC-to-DC subunit 6011 is connected to a positive electrode output end of the photovoltaic array and the midpoint potential of the direct current output bus 6013, and a third node of the second-level DC-to-DC subunit 6012 is connected to the positive electrode output end of the photovoltaic array and the midpoint potential of the direct current output bus 6013.

It may be clearly understood by persons skilled in the art that for the purpose of convenient and brief description, for a detailed working process of the system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in other embodiments. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the operations of the methods described in the embodiments of this application.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A photovoltaic power generation inverter system, comprising:
    a photovoltaic array being one of one or more photovoltaic arrays, each photovoltaic array comprises one or more cell panels;
    a direct current conversion unit being one of one or more direct current conversion units;
    a bus unit; and
    an inverter unit, wherein an input end of the direct current conversion unit is connected to an output end of the photovoltaic array, the bus unit is connected to an output end of the direct current conversion unit, the bus unit is connected to the inverter unit, and a direct current voltage in the bus unit is greater than a maximum system voltage applied to the cell panel, the direct current conversion unit is configured to perform direct current power conversion on a direct current voltage output by the photovoltaic array, and the inverter unit is configured to convert the direct current voltage in the bus unit into an alternating current voltage.

2. The system according to claim 1, wherein a positive electrode output end, a midpoint potential, and a negative electrode output end of the direct current conversion unit are respectively connected to a positive electrode, a midpoint potential, and a negative electrode of the bus unit through coupling, or a positive electrode output end and a negative electrode output end of the direct current conversion unit are respectively connected to a positive electrode and a negative electrode of the bus unit through coupling.

3. The system according to claim 1, wherein the bus unit is connected to the inverter unit through coupling by using a positive electrode, a midpoint potential, and a negative electrode, or the bus unit is connected to the inverter unit through coupling by using a positive electrode and a negative electrode.

4. A photovoltaic power generation inverter system, comprising:

a photovoltaic array being one of one or more photovoltaic arrays;

a direct current conversion unit being one of one or more direct current conversion units;

a bus unit;

an inverter unit; and a transformer, wherein an input end of the direct current conversion unit is connected to an output end of the photovoltaic array, the bus unit is connected to an output end of the direct current conversion unit, an input end of the inverter unit is connected to the bus unit, an output end of the inverter unit is connected to a secondary side of the transformer, a line voltage of the secondary side of the transformer is an alternating current voltage greater than 1000 V, and a primary side of the transformer is connected to a power grid, the direct current conversion unit is configured to perform direct current power conversion on a direct current voltage output by the photovoltaic array, the inverter unit is configured to convert a direct current voltage in the bus unit into an alternating current voltage, and the transformer is configured to transmit, to the power grid, the alternating current voltage output by the inverter unit.

5. The system according to claim 4, wherein a positive electrode output end, a midpoint potential, and a negative electrode output end of the direct current conversion unit are respectively connected to a positive electrode, a midpoint potential, and a negative electrode of the bus unit through coupling, or a positive electrode output end and a negative electrode output end of the direct current conversion unit are respectively connected to a positive electrode and a negative electrode of the bus unit through coupling.

6. The system according to claim 4, wherein the bus unit is connected to the inverter unit through coupling by using a positive electrode, a midpoint potential, and a negative electrode, or the bus unit is connected to the inverter unit through coupling by using a positive electrode and a negative electrode.

7. A photovoltaic power generation inverter system, comprising:

a photovoltaic array being one of one or more photovoltaic arrays;

a bus unit;

an inverter unit; and a transformer, wherein the bus unit is connected to the one or more photovoltaic arrays, the bus unit is connected to an input end of the inverter unit, an output end of the inverter unit is connected to a secondary side of the transformer, a line voltage of the secondary side of the transformer is an alternating current voltage greater than 1000 V, and a primary side of the transformer is connected to a power grid, the photovoltaic array is configured to generate direct current power, the inverter unit is configured to convert a direct current voltage in the bus unit into an alternating current voltage, and the transformer is configured to transmit, to the power grid, the alternating current voltage output by the inverter unit.

8. The system according to claim 7, wherein a positive electrode output end and a negative electrode output end of the photovoltaic array are respectively connected to a positive electrode and a negative electrode of the bus unit through coupling.

9. The system according to claim 7, wherein the bus unit is connected to the inverter unit through coupling by using a positive electrode, a midpoint potential, and a negative electrode, or the bus unit is connected to the inverter unit through coupling by using a positive electrode and a negative electrode.

10. A photovoltaic power generation inverter system, comprising:

a photovoltaic array being one of one or more photovoltaic arrays;

a direct current conversion unit being one of one or more direct current conversion units;

a bus unit; and an inverter unit, wherein an input end of one direct current conversion unit is connected to an output end of the photovoltaic array, the bus unit is connected to an output end of the direct current conversion unit, the inverter unit is connected to the bus unit, and a direct current voltage in the bus unit is greater than 1000 V, the direct current conversion unit is configured to perform direct current power conversion on a direct current voltage output by the photovoltaic array, and the inverter unit is configured to convert the direct current voltage in the bus unit into an alternating current voltage.

11. The system according to claim 10, wherein the direct current voltage in the bus unit is greater than 1500 V.

12. The system according to claim 10, wherein a positive electrode output end, a midpoint potential, and a negative electrode output end of the direct current conversion unit are respectively connected to a positive electrode, a midpoint potential, and a negative electrode of the bus unit through coupling, or a positive electrode output end and a negative electrode output end of the direct current conversion unit are respectively connected to a positive electrode and a negative electrode of the bus unit through coupling.

13. The system according to claim 10, wherein the bus unit is connected to the inverter unit through coupling by using a positive electrode, a midpoint potential, and a negative electrode, or the bus unit is connected to the seventh inverter unit through coupling by using a positive electrode and a negative electrode.

\* \* \* \* \*